United States Patent
Tomita

(10) Patent No.: US 6,951,366 B2
(45) Date of Patent: Oct. 4, 2005

(54) COMBINED STRUCTURE OF REAR PART OF BODY OF AUTOMOBILE

(75) Inventor: Tatsuzo Tomita, Ohbu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/817,873

(22) Filed: Apr. 6, 2004

(65) Prior Publication Data

US 2004/0195865 A1 Oct. 7, 2004

(30) Foreign Application Priority Data

Apr. 7, 2003 (JP) ........................................ 2003-103031

(51) Int. Cl.$^7$ .............................................. B62D 25/20
(52) U.S. Cl. ........................... 296/187.08; 296/187.12; 296/30; 296/209; 296/203.03; 296/203.04
(58) Field of Search ...................... 296/187.08, 187.11, 296/187.12, 193.05, 193.07, 193.08, 30, 209, 203.03, 203.04

(56) References Cited

U.S. PATENT DOCUMENTS 4,673,205 A * 6/1987 Drewek .................. 296/187.11
6,648,401 B2 * 11/2003 Behnke et al. .......... 296/203.04
6,672,653 B2 * 1/2004 Nishikawa et al. ...... 296/203.04

FOREIGN PATENT DOCUMENTS

JP 7-81627 A 3/1995

* cited by examiner

*Primary Examiner*—Jason Morrow
(74) *Attorney, Agent, or Firm*—Birch, Stewart, Kolasch & Birch, LLP

(57) ABSTRACT

A rear part of a body of an automobile has a side member, a cross member, and a side sill inner panel. The side member has a side lower wall, a side inside wall and a side outside wall. The front part of the side outside wall is provided at a position retreated from the front end of the side lower wall. The cross member has a cross bottom wall and a cross rear wall. The left and right ends of the cross bottom wall are fit and joined from the lower side to the side lower wall. The left and right ends of the cross rear wall are joined to the side inside wall. The rear part of the sill inner vertical wall of the side sill inner panel is fit and joined to the front part of the side outside wall.

9 Claims, 6 Drawing Sheets

COMBINED STRUCTURE OF REAR PART OF BODY OF AUTOMOBILE

CROSS-REFERENCE TO RELATED APPLICATIONS

This application is based upon and claims the benefit of priority from prior Japanese Patent Application No. 2003-103031, filed Apr. 7, 2003, the entire contents of which are incorporated herein by reference.

BACKGROUND OF THE INVENTION

1. Field of the Invention

The present invention relates to a combined structure of a cross member, a side member, a side sill inner panel, and a rear floor panel arranged at the rear of the body of an automobile.

2. Description of the Related Art

An automobile has a cross member, a side member, a side sill inner panel and a rear floor panel, in the structure of a rear part of a body. The cross member is arranged in the lateral direction of the body, and the side member is arranged in the longitudinal direction of the body. Both ends of the cross member are combined with the side sill inner panel. For example, as described in the paragraph 0007–0008 and shown in FIG. 1 of Jpn. Pat. Appln. KOKAI Publication No. 7-81627, a first flange provided at the front end of one of the side (inside wall) of the side members is combined with the side (rear wall) and lower surface (bottom wall) of the cross member. A second flange provided at the front end of the other side (outside wall) of the side member is combined with the side sill inner panel at the position more rearward than the cross member. A third flange suspended from the lower surface (lower wall) of the front end of the side member is combined with the floor panel passing under the cross member.

However, in the above structure, when joining the front panel last, it is necessary to make an opening to insert a gun for spot welding in any part of the member when joining the cross member and floor panel by spot welding. Likewise, when joining the side member last, it is necessary to make an opening for joining the flange of the inside wall of the side member to the cross member by spot welding. When joining the side sill inner panel last, it is necessary to make an opening for joining the both ends of the cross member to the side sill inner panel by spot welding. However, if an opening is made, the buckling strength in the direction along the surface with the opening is lowered. Therefore, it is desirable to perform welding without making an opening. As a method of welding without using an opening, there is one side welding which welds from the outside surface. However, it is difficult to contact closely the joined surfaces, and this method is undesirable to weld a part where a shearing load is acted on.

When welding the outside wall of the side member to the side sill inner panel, unless the floor panel is mounted last, spot welding is impossible by fitting without making an opening in any member. Therefore, at the front end of the outside wall of the side member, a flange folded rearward of the outside is provided along the side sill inner panel, and this flange is spot welded to the side sill inner panel. Thus, a load in the longitudinal direction such as a collision from the rearward acting on the outside wall of the side member is concentrated on the folded part, and not efficiently transmitted to the side sill inner panel. Further, the flange provided in the side member needs to be bent in various directions, and the flange is difficult to form.

BRIEF SUMMARY OF THE INVENTION

The present invention provides a combined structure, which is easy to combine, of a rear part of a body of an automobile with high rigidity against both loads from the rear and side.

The combined structure of a rear part of a body of an automobile according to the invention comprises a side member, a cross member, and a side sill inner panel. The side member is arranged on the left and right sides of the rear part of the body, along the longitudinal direction of the body of an automobile. The cross member is arranged along the width direction of the body, and the left and right ends are joined to the side member. The side sill inner panel is arranged along the longitudinal direction of the body in the width direction of the body more outside than the side member, and extending forward and rearward from the cross member. Further, the side member has a side lower wall, a side inside wall extending upward from the inside edge of the body of the side lower wall, and a side outside wall whose front edge is provided at a position retreated from the front end of the side lower wall. The cross member has a cross bottom wall whose left and right ends are fit and joined from the lower side to the side lower wall, and a cross rear wall which is joined to the middle of the side inside wall by the rearward flange extending rearward from the left and right ends along the side inside wall. The side sill inner panel has a sill inner vertical wall whose rear part is fit and joined from the outside of the width direction of the body to the front part of the side outside wall.

A bulkhead is provided at both left and right positions on the lateral extension of the cross rear wall through the side inside wall, to increase the rigidity against the load from the side. The side sill inner panel has a sill inner lower wall extending to the outward of the body from the lower edge of the sill inner vertical wall. The sill inner lower wall is fit and joined to the outward flange provided at the outside edge of the side lower wall.

A floor panel joined to the front edge of the cross bottom wall, the upper edge of the cross rear wall, the upper edge of the side inside wall and the sill inner upper wall extending to the outward of the body from the upper edge of the sill inner vertical wall, is provided to increase furthermore the rigidity of the combined structure of the rear part of the body. A bracket for joining the front edge of the side inside wall and the side lower wall to the floor panel is provided to simplify the processing of the side member. Further, to increase the number of joints and rigidity, one side welding technique of melting in the inward flange and front edge inside flange penetrating the floor panel is used to join the joint between the floor panel and the inward flange front end located more forward than the cross rear wall of the inward flange extending toward the inside of the body from the upper edge of the side inside wall, and the joint between floor panel and the front edge inside flange extending inward from the front edge of the bracket.

To meet automobiles using different sizes of wheel base and cabin, the section of the part surrounded by the side inside wall, side lower wall, sill inner vertical wall and floor panel are made the same shape over a longer range in the longitudinal direction than the part combined with the cross member.

To facilitate the work of joining each member, mount the floor panel after joining the side member and side sill inner panel. Or, join the side member and side sill inner panel, after joining the cross member and the bulkhead to the side member. Thereafter, join the floor panel to the side member, cross member and side sill inner panel.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

DETAILED DESCRIPTION OF THE INVENTION

Description will be given on a combined structure of a rear part of a body of an automobile according to an embodiment of the present invention, with reference to FIG. 1 to FIG. 7. The forward (front side), rearward (rear side), and left and right width directions are defined by taking the automobile advancing direction F as a reference. The direction toward the center of an automobile is assumed inward (inside), and the direction separating away from the center of an automobile is assumed outward (outside). The direction in which gravity is acted is assumed downward (lower side), and the direction working against gravity is assumed upward (upper side). The combined structure of the rear part of the body is symmetrical, and the left side is shown as an example and explained in this embodiment.

Figure 1:
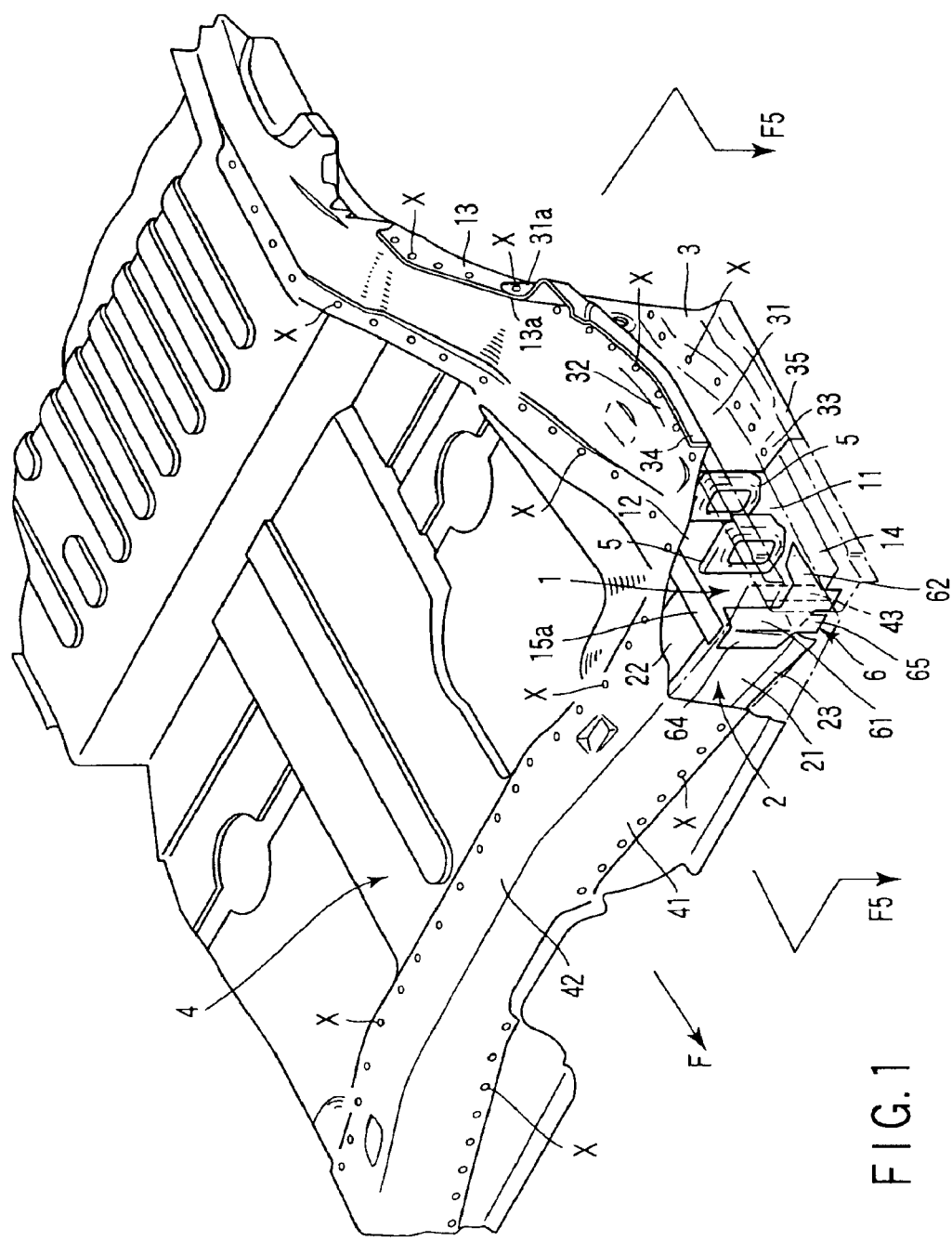
FIG. 1 is a perspective view showing the left side part seen from the front left side of a combined structure of a rear part of a body of an automobile according to an embodiment of the present invention.

The combined structure of the rear part of the body of an automobile shown in FIG. 1 comprises a side member 1, a cross member 2, a side sill inner panel 3, and a floor panel 4.

Figure 3:
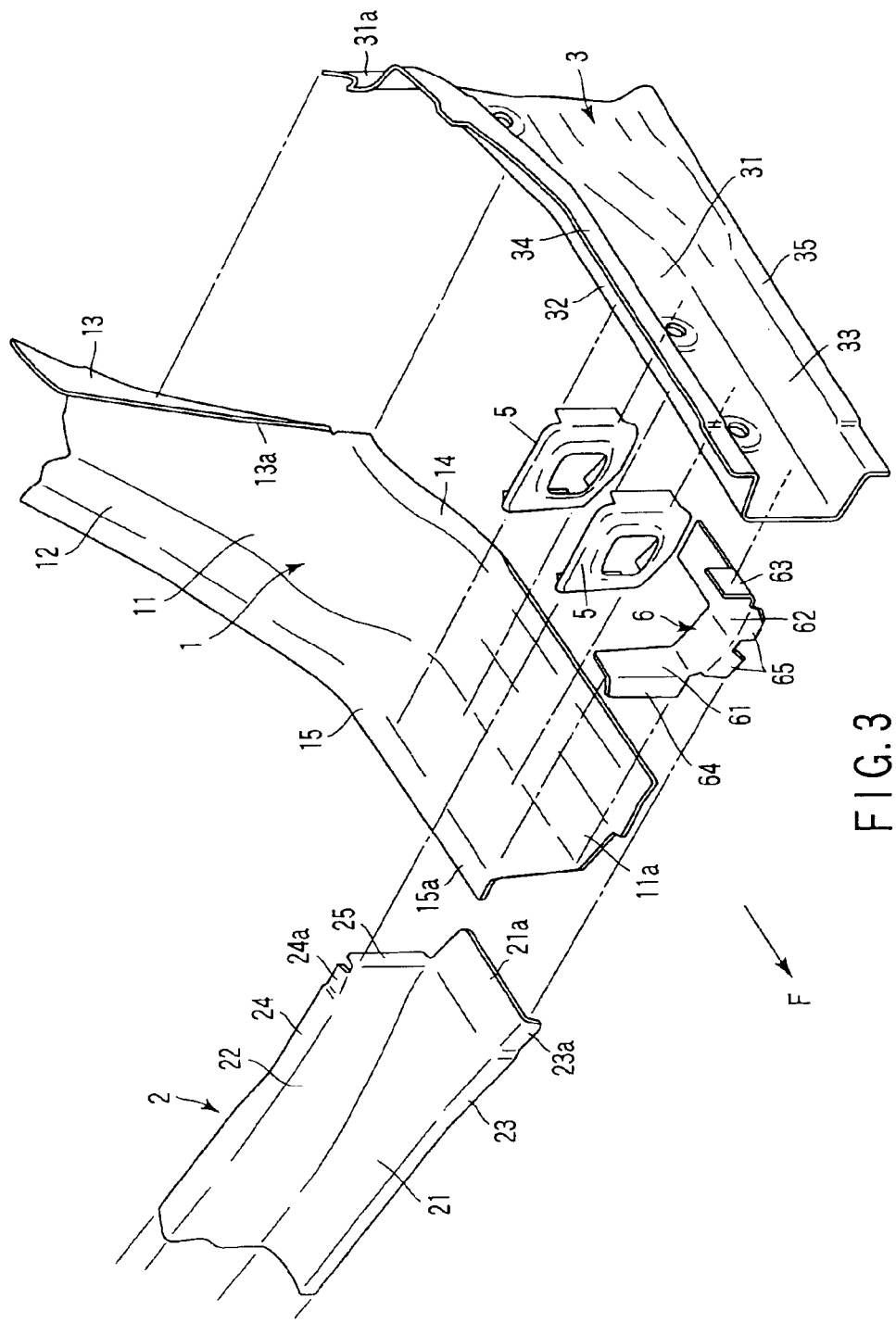
FIG. 3 is a disassembled perspective view of the combined structure of a rear part of a body of an automobile shown in FIG. 2.

The side member 1 is arranged on both sides of the rear part of the body along the longitudinal direction of the body of an automobile. The side member 1 is has a side lower wall 11, a side inside wall 12, and a side outside wall 13, as shown in FIG. 3. The side lower wall 11 has an outward flange 14 at the outside edge. The side inside wall 12 extends upward from the inside edge in the width direction of the body of the side lower wall 11. At the upper edge of the side inside wall 12, an inward flange 15 extending toward the inside is formed. The side outside wall 13 extends upward from the outside edge in the width direction of the body of the side lower wall 11. The front part 13a is provided at the position retreated from the front end 11a of the side lower wall 11.

Figure 2:
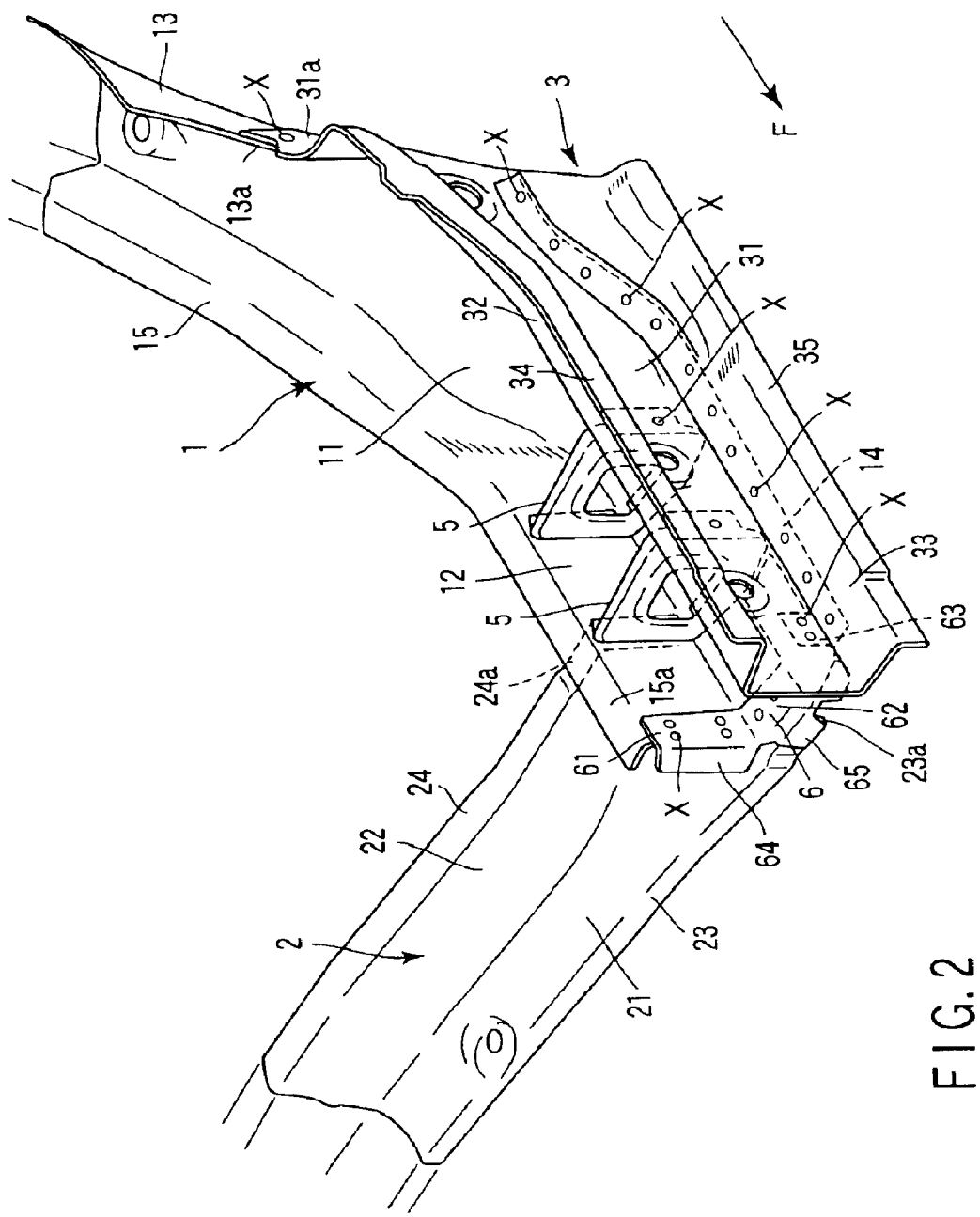
FIG. 2 is a perspective view of the combined structure of a rear part of a body of an automobile shown in FIG. 1, showing the state before mounting a floor panel.
Figure 5:
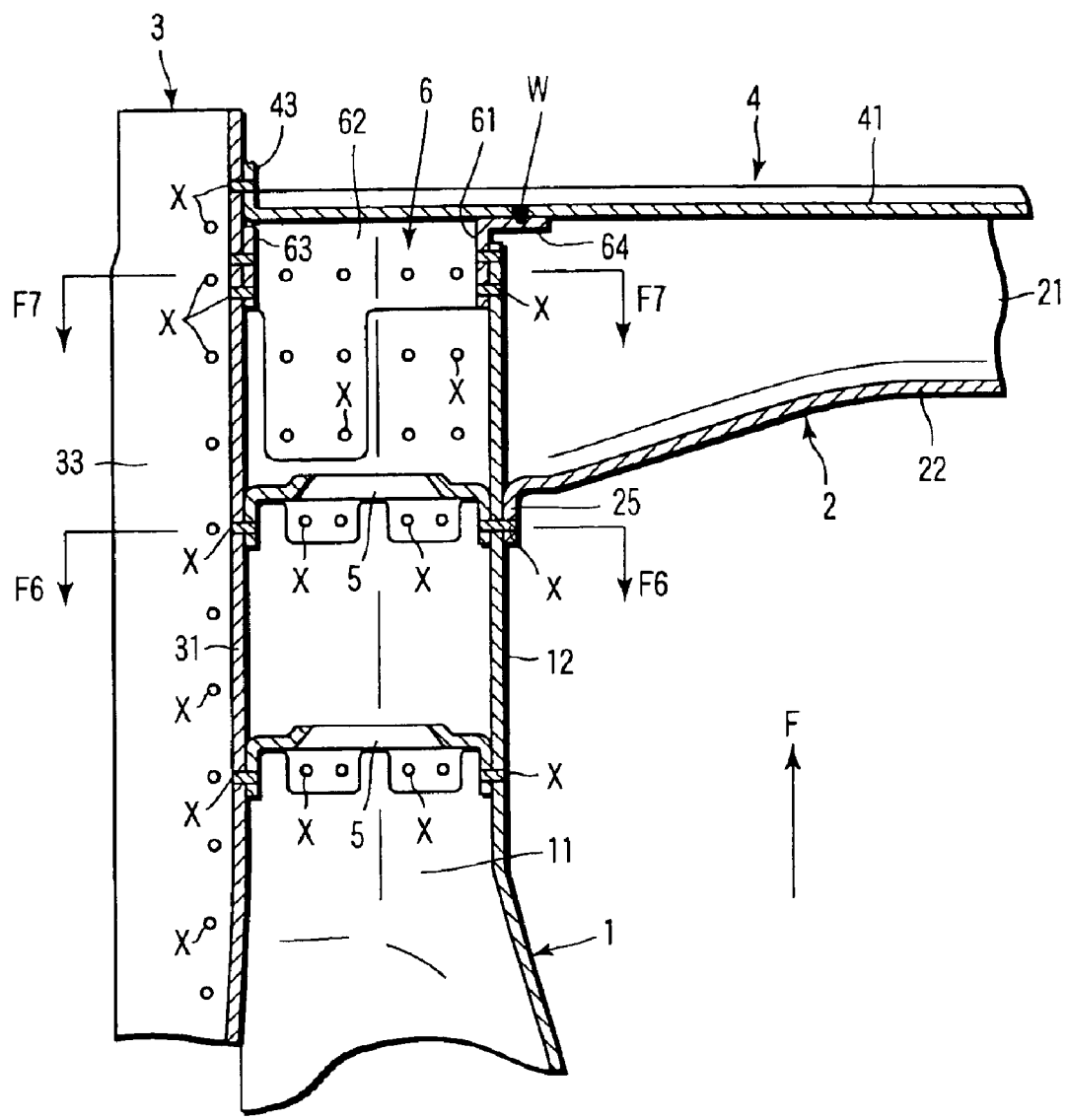
FIG. 5 is a sectional view of the combined structure of a rear part of a body of an automobile taken along F5—F5 shown in FIG. 1.

The cross member 2 is arranged along the width direction of the body, and the left and right ends are joined to the front part of the side member 1, as shown in FIG. 2. The cross member 2 has a cross bottom wall 21 and a cross rear wall 22, as shown in FIG. 3. In the cross bottom wall 21, left and right ends 21a extend toward the outside, and joined to the side lower wall 11 by being fit from the lower side. At the front edge of the cross bottom wall 21, a downward flange 23 extending downward is formed. The cross rear wall 22 has an upper edge rearward flange 24, a right edge rearward flange, and a left edge rearward flange 25. The upper edge rearward flange 24 extends rearward from the upper edge of the cross rear wall 22. The right edge rearward flange and the left edge rearward flange 25 extend rearward from the right side end and left side end respectively along the left and right side inside wall 12. As shown in FIG. 5, the cross rear wall 22 is joined at the middle of the side inside wall 12 by the right edge rearward flange and left edge rearward flange 25.

Figure 4:
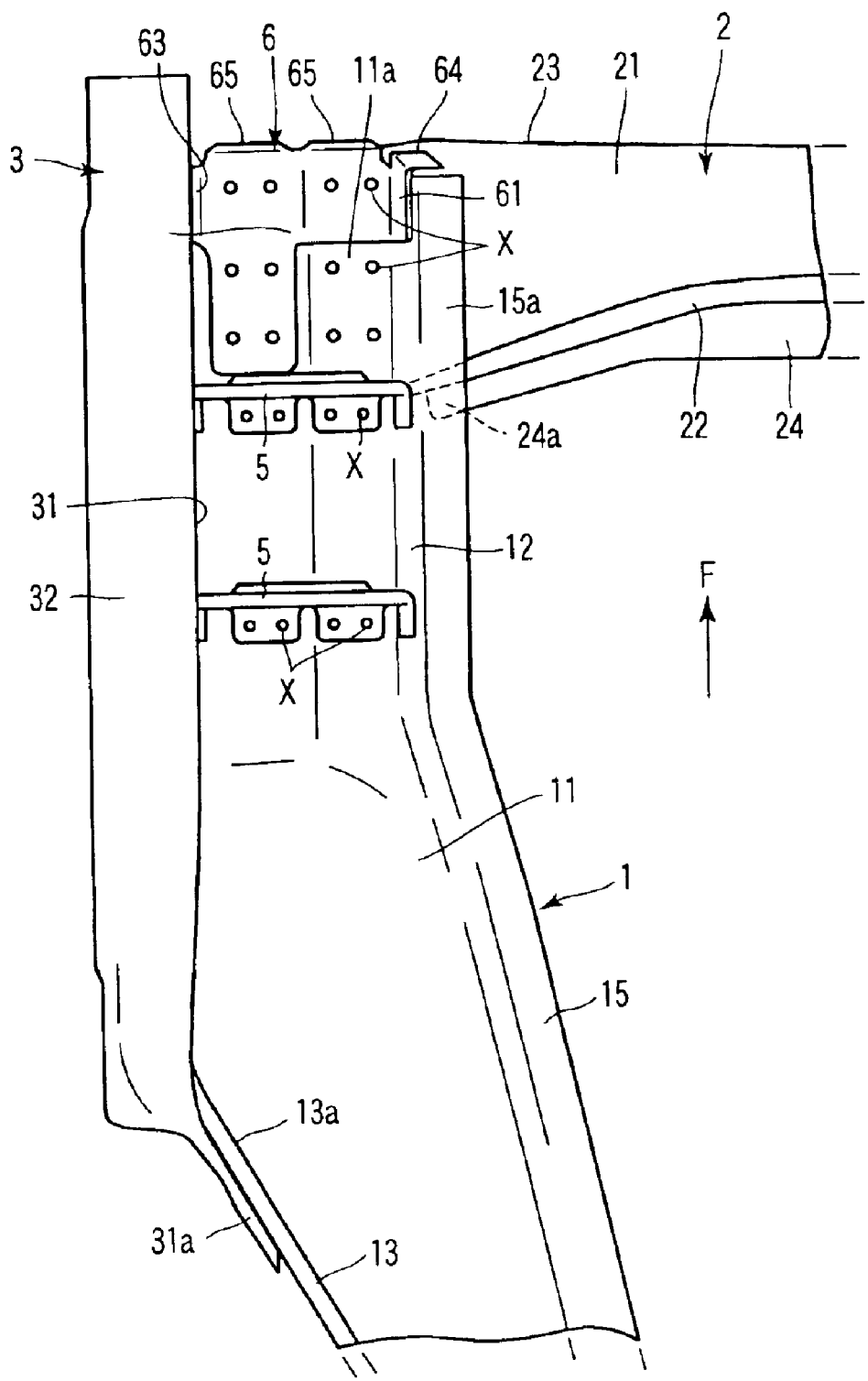
FIG. 4 is a plane view seen from the top of the combined structure of a rear part of a body of an automobile shown in FIG. 2.
Figure 6:
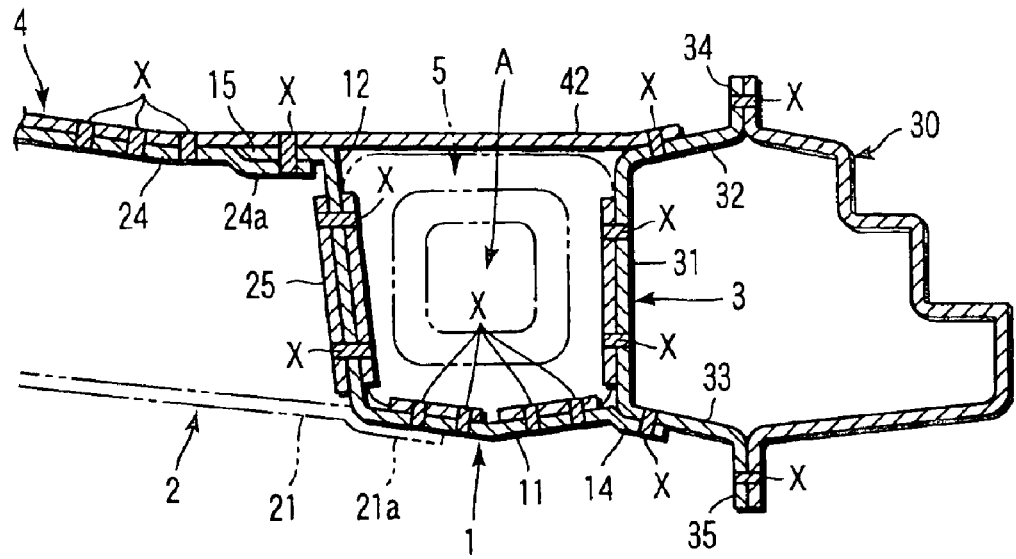
FIG. 6 is a sectional view of the combined structure of a rear part of a body of an automobile taken along F6—F6 shown in FIG. 5.
Figure 7:
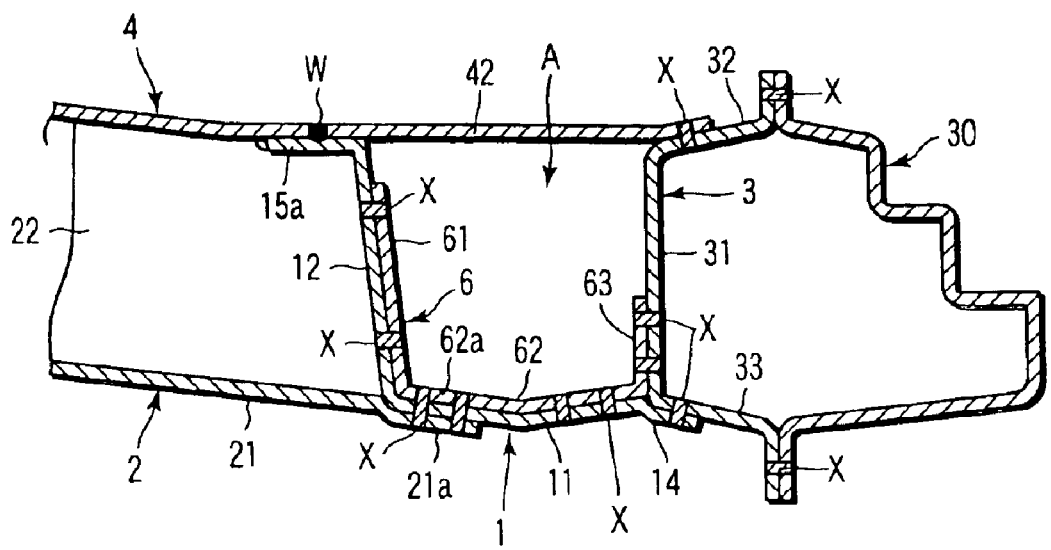
FIG. 7 is a sectional view of the combined structure of a rear part of a body of an automobile taken along F7—F7 shown in FIG. 5.

The side sill inner panel 3 is arranged more outside than the side member 1 along the longitudinal direction of the body, as shown in FIG. 2. The side sill inner panel 3 has a sill inner vertical wall 31, a sill inner upper wall 32 and a sill inner lower wall 33. As shown in FIG. 4, a rear part 31a of the sill inner vertical wall 31 is joined to the front part 13a of the side outside wall 13 by being fit from outside. As shown in FIG. 3, the sill inner upper wall 32 extends outward from the upper end of the sill inner vertical wall 31. The sill inner lower wall 33 extends outward from the lower end of the sill inner vertical wall 31. The side sill inner panel 3 has a sill inner upper flange 34 extending upward from the outside end of the sill inner upper wall 32, and a sill inner lower flange 35 extending downward from the outside end of the sill inner lower wall 33. The side sill inner panel 3 is joined to a side sill outer panel 30 by the sill inner upper flange 34 and sill inner lower flange 35, forming a side sill, as shown in FIG. 6 and FIG. 7.

As shown in FIG. 4 and FIG. 5, a bulkhead 5 is provided on the outward extension of the cross rear wall 22 and at the rear position parallel thereto, through the side inside wall 12. The bulkhead 5 is joined to the outside surface of the side inside wall 12, the upper surface of the side lower wall 11 and the inside surface of the sill inner vertical wall 31, respectively, as shown in FIG. 5 and FIG. 6.

The floor panel 4 has a floor front wall 41 and a floor upper wall 42, as shown in FIG. 1. The floor front wall 41 is joined to the downward flange 23 of the cross bottom wall 21. At the left and right ends of the floor front wall 41, a forward flange 43 extending forward along the sill inner vertical wall 31 of the side sill inner panel 3 is provided, as shown in FIG. 5. The floor front wall 41 is joined to the sill inner vertical wall 31 by the forward flange 43. The upper edge of the floor front wall 41 is connected to the front edge of the floor upper wall 42. The floor upper wall 42 is continuously formed rearward from the upper edge of the floor front wall 41. The floor upper wall 42 is joined to the upper edge rearward flange 24 of the cross rear wall 22, the inward flange 15 of the side inside wall 12, and the sill inner upper wall 32, as shown in FIG. 6. In this case, both ends 24a of the upper rearward flange 24 is joined to the inward flange 15 and floor upper wall 42 which are fit as a 3-ply.

As shown in FIG. 1, a bracket 6 is fit to the front end of the side member 1. The bracket 6 has a bracket inner wall 61, a bracket lower wall 62, and a bracket outer wall 63 which are formed continuously as shown in FIG. 3. As shown in FIG. 7, the bracket inner wall 61 is formed along the front outside surface of the side inside wall 12. The bracket lower wall 62 is formed along the front upper side surface of the side lower wall 11. The bracket outer wall 63 is formed along the front inside surface of the sill inner vertical wall 31. The bracket inner wall 61 is provided with a front edge inside flange 64 extending inward from the front edge. The bracket lower wall 62 is provided with a front edge lower side flange 65 extending downward from the front edge.

The section A in the width direction of the part surrounded by the side inside wall 12, side lower wall 11, sill inner vertical wall 31 and floor upper wall 42 has the same form over a longer range in the longitudinal direction than the part where the cross member 2 is combined with the side member 1. Having the part formed like this, it is possible to meet automobiles with different wheel base and cabin sizes by using the side member 1 manufactured from the same mold and displacing the mounting positions of the cross member 2 and bulkhead 5.

Next, explanation will be given on the order of joining each part.

First, fix the bulkhead 5 and bracket 6 to the side member 1. In this step, just join the bulkhead 5 arranged on the extension of the cross rear wall 22 to the side lower wall 11, and don't join to the side inside wall 12. Likewise, don't join the bracket lower wall 62 in the range where the side lower wall 11 and cross bottom wall 21 are fit.

The side member 1 equipped with the bulkhead 5 and bracket 6 is joined to the cross member 2. In this step, fit as a 3-ply and join the bulkhead 5, the left edge rearward flange 25 of the cross rear wall 22, and the side inside wall 12 which are not joined in the preceding step, as shown in FIG. 5 and FIG. 6. Likewise, fit as a 3-ply and join the part 62a of the bracket lower wall 62, the both ends 21a of the cross bottom wall 21, and the side lower wall 11 which are not joined in the preceding step. Don't join both ends 24a of the upper edge rearward flange 24 fit with the inward flange 15, and the left and right end parts 23a of the downward flange 23 fit to the front edge lower side flange 65.

After the side member 1 and cross member 2 are joined, the side sill inner panel 3 is joined to the side member 1, bulkhead 5 and bracket 6, making the state shown in FIG. 2. The sill inner lower wall 33 is fit to the outward flange 14 of the side lower wall 11 from the top, as shown in FIG. 6 and FIG. 7, and joined thereto as shown in FIG. 2. The sill inner vertical wall 31 is joined to the bulkhead 5 and bracket outer wall 63. As shown in FIG. 4, the rear part 31a of the sill inner vertical wall 31 is fit from outside and joined to the front part 13a of the side outside wall 13.

Thereafter, join the floor panel 4 to the side member 1, cross member 2 and side sill inner panel 3. The forward flange 43 of the floor front wall 41 is joined to the sill inner vertical wall 31, as shown in FIG. 5. The downward flange 23 of the cross bottom wall 21 and the front edge lower side flange 65 of the bracket 6 are joined to the floor front wall 41. The joint between the inward flange front end 15a of the side inside wall 12 located in front of the cross rear wall 22 and the floor upper wall 42, and the joint between the front edge inside flange 64 of the bracket 6 and floor front wall 41 are joined by the one side welding W penetrated into the inward flange front end 15a and front edge inside flange 64 through the floor panel 4, as shown in FIG. 7 and FIG. 5.

By assembling in the above procedure, the joints except the part for one side welding W can be joined by spot welding X. In addition to the spot welding W, TIG welding, MIG welding and YAG laser welding may be used for joining the joints. The one side welding is preferably performed by YAG laser welding, and TIG welding not adding filler metal, so-called non-filler metal welding, or TIG or MIG welding adding filler metal are available. The inward flange front end 15a and front edge inside flange 64 may be welded either by partial penetration welding or full penetration welding by the one side welding W.

The above procedure is an example of the procedures of assembling the combined structure of the rear part of the body of an automobile. Therefore, it is permitted to join the side member 1 and side sill inner panel 3, before joining the side member 1 and cross member 2. It is also permitted to equip the bulkhead 5 and bracket 6, after joining the side member 1 and side sill inner panel 3.

In the above combined structure of the rear part of the body of an automobile, the front part 13a of the side outside wall 13 and the rear part 31a of the sill inner vertical wall 31 are fit and joined, and the outward flange 14 of the side lower wall 11 and the sill inner lower wall 33 are fit and joined. Therefore, a load caused by a collision from the rearward is effectively transmitted from the side member 1 to the side sill inner panel 3 (side sill). The floor front wall 41 is joined to the sill inner vertical wall 31, both ends 21a of the cross bottom wall 21 are fit and joined to the side lower wall 11, the outward flange 14 of the side lower wall 11 is fit and joined to the sill inner lower wall 33, and the bulkhead 5 is provided on the extension of the cross rear wall 22 through the side inside wall 12. Therefore, a load caused by a collision (side crush) from outside is effectively transmitted from the side sill inner panel 3 to the cross member 2. As explained above, in the combined structure of the rear part of the body of an automobile, the load is efficiently transmitted between the members, and the load is not concentrated on a specific part, and the rigidity of the body is increased.

The floor panel 4 is joined, after the side member 1 and side sill inner panel 3 are joined. Therefore, it is possible to join easily the side member 1 and cross member 2, and join the side member 1 and side sill inner panel 3 without making an opening for joining on the wall of each member in the combined structure of the rear part of the body of an automobile. At the same time, the following five items can be satisfied. The side inside wall 12 is made of a member continued to the floor front wall 41. The bulkhead 5 is provided on the extension of the cross rear wall 22 through the side inside wall 12. The both ends 21a of the cross bottom wall 21 are fit and joined to the side lower wall 11. The outward flange 14 of the side lower wall 11 and the sill inner lower wall 33 are fit and joined. The front part 13a of the side outside wall 13 and the rear part 31a of the sill inner vertical wall 31 are fit and joined.

The bracket 6 for joining the side member 1 and floor panel 4 is provided, and the molding of the side member 1 is easy. The combined structure meets automobiles with different wheelbase and cabin sizes simply by attaching the bracket 6 to the front edge of the side member 1 with the changed front part length.

Further, since the inward flange front end 15a of the side inside wall 12 and the front edge inside flange 64 of the bracket 6 are welded to the floor panel 4 by the one side welding W, there is no part left not joined in the combined part of the cross member 2 and side member 1, and the rigidity is increased.

In the combined structure of the rear part of the body of an automobile according to the present invention, the rear part of the sill inner vertical wall is fit and joined from outside to the front part of the side outside wall. Therefore, a load of such as a collision transmitted through the side member from the rear is efficiently transmitted to the side sill inner panel. The cross bottom wall is fit and joined from the lower side to the side lower wall. Therefore, a load such as a collision from the side of the body is efficiently transmitted to the cross member. As explained above, with the combined structure of the rear part of the body of an automobile according to the present invention, the members can be easily joined without complicating the structure of each member, and the load from the rear and side can be efficiently transmitted, increasing the rigidity.

By providing a bulkhead at a position on the lateral extension of the cross rear wall through the side inside wall, the load from the side can be efficiently transmitted to the cross rear wall. Since the sill inner lower wall is fit and joined to the outside edge of the side lower wall, the load is efficiently transmitted between the side lower wall and sill inner lower wall.

Further, as a floor panel is provided to be joined to the front edge of the cross bottom wall, the upper edge of the cross rear wall, the upper edge of the side inside wall, the sill inner upper wall and the sill inner vertical wall, the rigidity of the combined structure of the rear part of the body of an automobile is increased. As a bracket is provided to join the front end of the side member and the floor panel, the processing of the side member can be simplified. The joint between the inward flange front end of the side inside wall and the floor panel, and the joint between the front edge inside flange of the bracket and the floor panel, are joined by one side welding which penetrates into the inward flange front end and front edge inside flange through the floor panel. This increases the number of joined parts, and increases the rigidity as a combined structure of a rear part of a body of an automobile.

The section in the width direction of the part surrounded by the side inside wall, side lower wall, sill inner vertical wall and floor panel is made the same shape over a longer range in the longitudinal direction than the combined part of the side member and cross member. Therefore, it is possible to meet easily to automobiles with different wheelbase and cabin sizes simply by shifting the cross member fitting position to the front or rear.

Each part can be easily joined without making an opening for joining on the wall of each member, by mounting the floor panel after joining the side member and side sill inner panel, or by joining the side member and side sill inner panel after joining the cross member and bulkhead to the side member, and thereafter joining the floor panel to the side member, cross member and side sill inner panel. Therefore, the rigidity of the joined structure of the rear part of the body of an automobile is increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and their equivalents thereof.

What is claimed is:

1. A combined structure of a rear part of a body of an automobile comprising:

a pair of side members, one of the side members being arranged respectively on the left and right sides of a rear part of a body of an automobile along the longitudinal direction of the body;

a cross member which is arranged along the width direction of the body and whose left and right ends are joined to the side member; and a side sill inner panel which is arranged along the longitudinal direction of the body in the width direction of the body more outside than the side member and extended more forward and rearward than the cross member, wherein the side member has a side lower wall, a side inside wall which extends upward from the inside edge of the side lower wall, and a side outside wall whose front part is provided at a position retreated from the front end of the side lower wall;

the cross member has a cross bottom wall to which left and right ends are fit and joined from the lower side to the side lower wall, and a cross rear wall which is joined to a middle of the side inside wall by a rearward flange extending from the left and right ends rearward along the side inside wall; and the side sill inner panel has a sill inner vertical wall whose rear part is fit and joined to the front part of the side outside wall from the outside of the width direction of the body.

2. The combined structure of the rear part of the body of an automobile according to claim 1, wherein a bulkhead is provided at a position on an extension of the cross rear wall and opposes the cross rear wall across the side inside wall.

3. The combined structure of the rear part of the body of an automobile according to claim 1, wherein the side sill inner panel has a sill inner lower wall which extends to the outward of the body from the lower edge of the sill inner vertical wall; and the sill inner lower wall is fit and joined to an outward flange provided at the outside edge of the side lower wall.

4. The combined structure of the rear part of the body of an automobile according to claim 1, further comprising a floor panel which is joined to the front edge of the cross bottom wall, the upper edge of the cross rear wall, the upper edge of the side inside wall and a sill inner upper wall extending to the outward of the body from the upper edge of the sill inner vertical wall.

5. The combined structure of the rear part of the body of an automobile according to claim 4, further comprising a bracket which joins the front ends of the side inside wall and the side lower wall to the floor panel.

6. The combined structure of the rear part of the body of an automobile according to claim 5, wherein the joint between the floor panel and an inward flange front end located more forward than the cross rear wall of the inward flange extending toward the inside of the body from the upper edge of the side inside wall, and the joint between floor panel and a front edge inside flange extending inward from the front edge of the bracket, are joined by one side welding which penetrates into an inward flange front end and the front edge inside flange through the floor panel.

7. The combined structure of the rear part of the body of an automobile according to claim 1, wherein the section of the part surrounded by the side inside wall, the side lower wall, the sill inner vertical wall and the floor panel is made same shape over a longer range in the longitudinal direction than the combined part of the side member and cross member.

8. The method of making a rear part of an automobile that includes:

a pair of side members, one of the side members being arranged respectively on the left and right sides of a rear part of a body of an automobile along the longitudinal direction of the body;

a cross member which is arranged along the width direction of the body and whose left and right ends are joined to the side member; and a side sill inner panel which is arranged along the longitudinal direction of the body in the width direction of the body more outside than the side member and extended more forward and rearward than the cross member, wherein the side member has a side lower wall, a side inside wall which extends upward from the inside edge of the side lower wall, and a side outside wall whose front part is provided at a position retreated from the front end of the side lower wall;

the cross member has a cross bottom wall to which left and right ends are fit and joined from the lower side to the side lower wall, arid a cross rear wall which is joined to a middle of the side inside wall by a rearward flange extending from the left and right ends rearward along the side inside wall;

the side sill inner panel has a sill inner vertical wall whose rear part is fit and joined to the front part of the side outside wall from the outside of the width direction of the body, and a floor panel which is joined to the front edge of the cross bottom wall, the upper edge of the cross rear wall, the upper edge of the side inside wall and a sill inner upper wall extending to the outward of the body from the upper edge of the sill inner vertical wall, comprising the steps in sequence of, (1) joining the side member and the side sill inner panel, and thereafter, (2) mounting the floor panel.

9. The method of making a rear part of an automobile that includes:

a pair of side members, one of the side members being arranged respectively on the left and right sides of a rear part of a body of an automobile along the longitudinal direction of the body;

a cross member which is arranged along the width direction of the body and whose left and right ends are joined to the side member; and a side sill inner panel which is arranged along the longitudinal direction of the body in the width direction of the body more outside than the side member and extended more forward and rearward than the cross member, wherein the side member has a side lower wail, a side inside wall which extends upward from the inside edge of the side lower wall, and a side outside wall whose front part is provided at a position retreated from the front end of the side lower wall;

the cross member has a cross bottom wall to which left and right ends are fit and joined from the lower side to the side lower wall, and a cross rear wall which is joined to a middle of the side inside wall by a rearward flange extending from the left and right ends rearward along the side inside wall;

the side sill inner panel has a sill inner vertical wall whose rear part is fit and joined to the front part of the side outside wall from the outside of the width direction of the body, and a floor panel which is joined to the front edge of the cross bottom wall, the upper edge of the cross rear wall, the upper edge of the side inside wall and a sill inner upper wall extending to the outward of the body from the upper edge of the sill inner vertical wall, comprising the steps in sequence of, (1) joining the cross member and the bulkhead to the side member, (2) joining the side member and side sill inner panel, and thereafter (3) joining the floor panel to the side member, cross member and side sill inner panel.

* * * * *